United States Patent
Kim et al.

(10) Patent No.: US 8,520,128 B2
(45) Date of Patent: Aug. 27, 2013

(54) AUTO FOCUS MODULE CAPABLE OF IN-PIXEL MONITORING OF AMOUNT OF RECEIVED LIGHT PHOTOGRAPHING APPARATUS USING THE SAME

(75) Inventors: Il-Do Kim, Suwon-Si (KR); Ki-Sub Song, Suwon-Si (KR); Gun-Hee Han, Seoul (KR); Jin-Min Cheon, Seoul (KR); Jeong-Hwan Lee, Seoul (KR)

(73) Assignees: Samsung Electronics Co., Ltd. (KR); Industry-Academic Cooperation Foundation, Yonsei University (KR)

( * ) Notice: Subject to any disclaimer, the term of this patent is extended or adjusted under 35 U.S.C. 154(b) by 725 days.

(21) Appl. No.: 12/632,181

(22) Filed: Dec. 7, 2009

(65) Prior Publication Data
US 2010/0182489 A1 Jul. 22, 2010

(30) Foreign Application Priority Data
Jan. 20, 2009 (KR) ........................ 10-2009-0004514

(51) Int. Cl.
*G03B 13/00* (2006.01)
*H04N 5/232* (2006.01)

(52) U.S. Cl.
USPC ............................ 348/345; 348/349; 348/350

(58) Field of Classification Search
USPC ........................................ 348/345, 349, 350
See application file for complete search history.

(56) References Cited

U.S. PATENT DOCUMENTS

| | | | | |
|---|---|---|---|---|
| 4,182,561 A * | 1/1980 | Land et al. | | 396/205 |
| 4,972,252 A * | 11/1990 | Maekawa | | 257/448 |
| 5,343,255 A * | 8/1994 | Lagoni | | 348/678 |
| 5,900,927 A * | 5/1999 | Hasegawa | | 356/3.13 |
| 6,046,466 A * | 4/2000 | Ishida et al. | | 257/258 |
| 6,389,368 B1 * | 5/2002 | Hampton | | 702/179 |
| 6,922,526 B2 * | 7/2005 | Nakata et al. | | 396/96 |
| 7,106,377 B2 * | 9/2006 | Bean et al. | | 348/364 |
| 2002/0100863 A1 * | 8/2002 | Spears | | 250/208.1 |
| 2003/0175987 A1 * | 9/2003 | Verdonk et al. | | 436/172 |
| 2006/0055813 A1 * | 3/2006 | Nakata et al. | | 348/345 |
| 2008/0128590 A1 * | 6/2008 | Tsunai et al. | | 250/208.1 |
| 2008/0136952 A1 * | 6/2008 | Loose | | 348/301 |

* cited by examiner

*Primary Examiner* — Antoinette Spinks
(74) *Attorney, Agent, or Firm* — The Farrell Law Firm, P.C.

(57) ABSTRACT

Disclosed are an auto focus (AF) module and a photographing apparatus employing the same. The AF module may include an AF sensor having a plurality of AF pixels and a controller. The controller receives an information regarding the amount of light respectively received by the light receiving elements of one or more of the plurality of AF pixels from the one or more of the plurality of AF pixels. The controller of the AF sensor may be configured to control the operations, e.g., the light exposure timing, of the plurality of AF pixels based on the information received from the AF pixels.

20 Claims, 11 Drawing Sheets

AF Pixel (3-Tr)

AUTO FOCUS MODULE CAPABLE OF IN-PIXEL MONITORING OF AMOUNT OF RECEIVED LIGHT PHOTOGRAPHING APPARATUS USING THE SAME

CROSS-REFERENCE TO RELATED APPLICATIONS

This application claims the benefit of Korean Patent Application No. 10-2009-04514, filed in the Korean Intellectual Property Office on Jan. 20, 2009, the disclosure of which is incorporated herein by reference in its entirety.

TECHNICAL FIELD

Apparatuses and methods consistent with the present disclosure relate generally to an auto focus (AF) module and a photographing apparatus using the same, and more particularly, to an AF module of an improved sensor structure and a photographing apparatus using the same.

BACKGROUND OF RELATED ART

A camera capable of performing an automatic focusing includes an auto focus (AF) sensor for generating the necessary AF data. An example of such a AF sensor is illustrated in FIG. 1, and as shown may include a number of AF pixels (1, 2, 3, . . . ) disposed in a row or multiple rows, each of which pixels may generate AF data.

An example of a circuit diagram of an AF pixel of FIG. 1 is illustrated in FIG. 2. As shown in FIG. 2, an AF pixel may include a photo diode (PD) and transistors (Tr1, Tr2, and Tr3).

The PD receives a portion of light received through one or more lenses of the camera while the transistors (Tr1, Tr2, and Tr3) generate AF data using the output of the PD. Since there are 3 transistors, the AF pixel of FIG. 2 may be referred to as having a 3-Tr structure.

In the example pixel circuitry of FIG. 2, the transistor Tr1 discharges the electrical charge of the PD, and is often referred to as a reset transistor that resets the photodiode PD. The transistors Tr2 and Tr3 form a source follower, and transmits the output of the PD to a output terminal, which output representing the AF data.

As illustrated in the FIG. 2, the output of the PD is output to the output terminal via the source follower in the 3-Tr AF pixel, the gain of which source follower does not exceed '1' Accordingly, the sensitivity of AF data output from the 3-Tr AF pixel may be low.

An example AF sensor of a conventional designed to address the above sensitivity issues is illustrated in FIG. 3. In addition to the AF pixels (1, 2, 3, . . . ), the AF sensor shown in FIG. 3 includes a monitoring pixel 20. The AF pixels (1, 2, 3, . . . ) in FIG. 3 are of the 4-Tr type, which are thus different from the 3-Tr type AF pixels of FIG. 1.

A circuit diagram for an example of a 4-Tr type AF pixel is illustrated in FIG. 4. As illustrated in FIG. 4, the AF pixel may comprises a photodiode PD and transistors (Tr1, Tr2, Tr3, and Tr4), that is, as the name suggests, the 4-Tr type AF pixel includes four transistors.

The transistor Tr1 discharges the electrical charge from the photodiode PD, and is thus the reset transistor that resets the PD. The transistors Tr2 and Tr3 form a source follower, which transmits an amplified output of the PD via the transistor Tr4 to the output terminal.

Because the PD output is transmitted via the transistor Tr4, the sensitivity of the AF data output from the 4-Tr type AF pixel may be higher. However, it may be difficult or even impossible to monitor the amount of received light by the PD in the 4-Tr type AF pixel in real time.

This is because it is difficult or even impossible to effectively monitor the light exposure time of the PD. If the light exposure time is not effectively controlled, the operational efficiency of the AF pixel may be thus adversely impacted, which may ultimately result, in a degradation of the AF performance.

In an attempt to address the above shortcoming, an AF sensor employing the 4-Tr type AF pixel may use the monitor pixel 20 to estimate the amount of received light in the AF pixel. In such AF sensor, the monitor pixel 20 is generally implemented as a 3-Tr type pixel as illustrated in FIG. 2.

However, as illustrated in FIG. 3, the location of the monitor pixel 20 is different from the locations of the AF pixels (1, 2, 3, . . . ) themselves, and the amount of light as monitored by the monitoring pixel 20 may in some situations be inaccurate.

For example, as illustrated in FIG. 5, although an image of a brighter area of a subject may be formed on the AF pixels (1, 2, 3, . . . ), an image of a darker area of the subject may be formed in the monitor pixel 20. In such a situation, the amount of received light in the AF pixels (1, 2, 3, . . . ) may be inaccurately estimated by the monitoring pixel 20.

Moreover, since the AF sensor monitors the amount of received light using the monitoring pixel 20, it may not be possible to monitor the amount of received light in one or more AF pixels on an individual basis, and it may thus not be possible to control the light exposure time of one or more AF pixels on an individual basis.

SUMMARY OF THE DISCLOSURE

According to an aspect of the present disclosure, there may be provided an photographing apparatus that may comprise one or more lenses, an auto focus (AF) sensor and an AF control unit. The one or more lenses may allow light to be received therethrough into the photographing apparatus. The auto focus (AF) sensor may be configured to generate AF data. The AF control unit may be configured to receive the AF data from the AF sensor and to control focusing of the one or more lenses using the received AF data. The AF sensor may include a plurality of AF pixels and a control element. Each of the plurality of AF pixels may comprise a light-receiving element and a circuit element. The light-receiving element may be configured to receive a portion of the light received into the photographing apparatus, and may be configured to produce an output in response to the received portion of the light. The circuit element may be configured to generate the AF data using the output of the light-receiving element. The control element of the AF sensor may be configured to receive, from each of a first set AF pixels among the plurality of AF pixels, an information about an amount of light received by the light-receiving element of the respective one of the first set AF pixels, and may be configured to control an operation of the plurality of AF pixels based on the information about the amount of received light received from the first set AF pixels.

The first set AF pixels may include each and every one of the plurality of AF pixels.

The photographing apparatus may further comprise a photographing unit, a signal processing unit, a codec and a storage unit. The photographing unit may be configured to output an image signal in response to the light received into the photographing apparatus through the one or more lenses. The signal processing unit may be configured to receive the image signal from the photographing unit and to perform a signal processing on the received image signal to produce image data. The codec may be configured to receive the image data from the signal processing unit and to compress the received image data to produce a compressed image data. The storage unit may be configured to store therein the compressed image data.

The control element may receive the information about the amount of received light of the light-receiving element in real time.

Each of the plurality of AF pixels may include four transistors.

The control element may be configured to control a light exposure time of the light-receiving element of each of the plurality of AF pixels using the received information about the amount of received light.

Each of the plurality of AF pixels may further comprise a capacitor connected to the light-receiving element. The information about the amount of received light of the light-receiving element may comprise a level electrical charge present in the capacitor.

The capacitor may be connected to an N-pole of the light-receiving element.

The light-receiving element may comprise a photodiode. The capacitor may comprise an electrode and an area of an n-layer of the photodiode arranged to extend parallel to, and spaced apart form, each other.

The electrode may comprise a poly electrode.

The area of the n-layer of the photodiode that forms the capacitor together with the electrode may not be in contact with a p+ layer of the photodiode.

The area of the n-layer of the photodiode that forms the capacitor together with the electrode extends to protrude beyond the p+ layer of the photodiode.

The photographing apparatus may further comprise a switching unit arranged between the plurality of AF pixels and the control element. The switching unit may be configured to selectively establish communicative connections between select ones of the plurality of AF pixels and the pixel control unit.

The control unit may be configured to control the operation of the light-receiving element based on one of: 1) a maximum value from among the amounts of light received by the light-receiving elements of the plurality of AF pixels; 2) an average value of the maximum value and a minimum value from among the amounts of light received by the light-receiving elements of the plurality of AF pixels; and 3) a difference between the maximum value, and the minimum value.

The control element may be configured to terminate light exposure of the light-receiving elements of the plurality of AF pixels when one of maximum value, the minimum value and the difference reaches a reference value.

According to another aspect of the present disclosure, an auto focus (AF) module for controlling focusing of a photographing unit of an photographing apparatus may be provided to comprise an AF sensor and a control unit. The AF sensor may be configured to generate AF data. The control unit may be configured to control the focusing of the photographing unit using the AF data generated by the AF sensor. The AF sensor may include a plurality of AF pixels and a control element. Each of the plurality of AF pixels may comprise a light-receiving element and a circuit element. The light-receiving element may be configured to receive a portion of light incident upon the photographing unit, and may be configured to produce an output in response to the received portion of light. The circuit element may be configured to generate the AF data using the output of the light-receiving element. The control element may be configured to receive from an AF pixel an information about an amount of light received by the light-receiving element of the AF pixel, and may be configured to control operations of the plurality of AF pixels based on the received information about the amount of received light.

BRIEF DESCRIPTION OF THE DRAWINGS

Various features and advantages of the disclosure will become more apparent by the following detailed description of several embodiments thereof with reference to the attached drawings, of which.

DETAILED DESCRIPTION OF SEVERAL EMBODIMENTS

Figure 1:
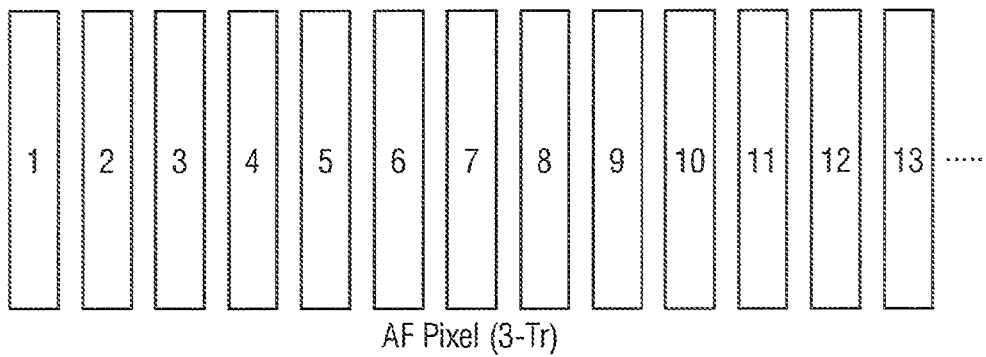
FIG. 1 is a schematic view illustrating an example of a conventional AF sensor.
Figure 2:
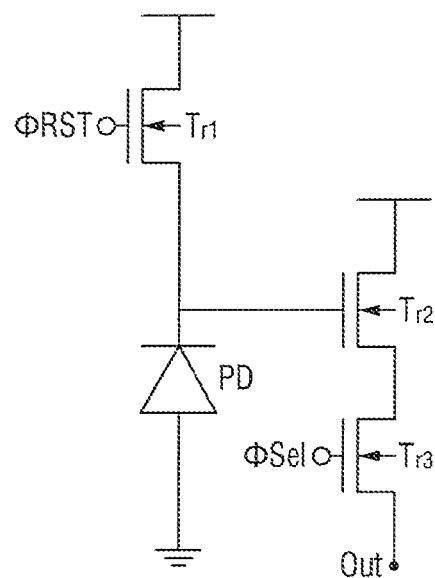
FIG. 2 is a circuit diagram of an example of an AF pixel of a 3-Tr type.
Figure 3:
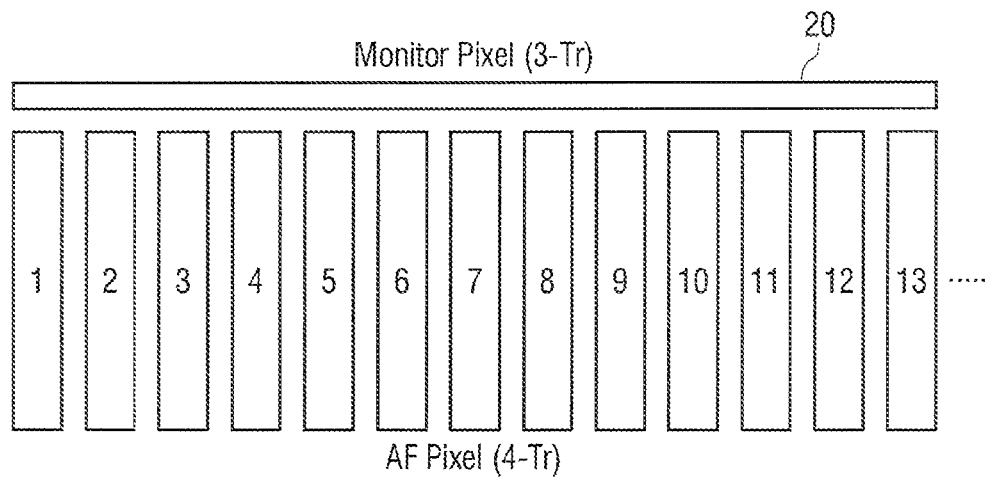
FIG. 3 is a schematic view illustrating another example of a conventional AF sensor.
Figure 4:
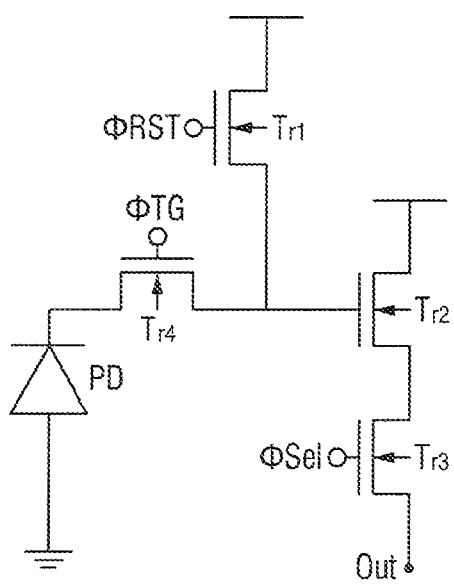
FIG. 4 is a circuit diagram of an example of an AF pixel of a 4-Tr type.
Figure 5:
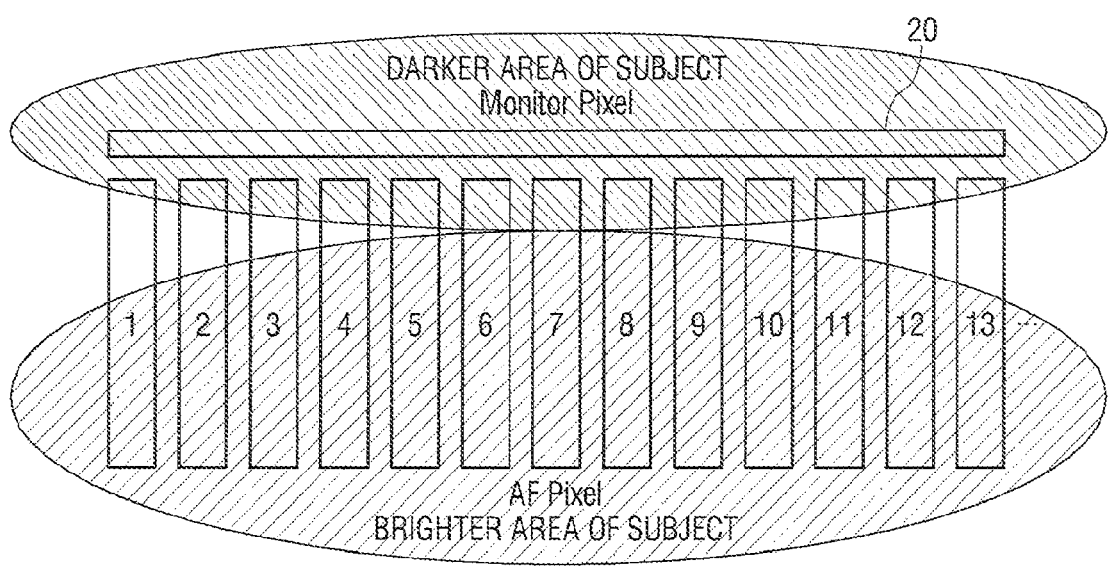
FIG. 5 illustrates a shortcoming of an AF sensor of the configuration illustrated in FIG. 3.

Reference will now be made in detail to the embodiment, examples of which are illustrated in the accompanying drawings, wherein like reference numerals refer to like elements throughout. While the embodiments are described with detailed construction and elements to assist in a comprehensive understanding of the various applications and advantages of the embodiments, it should be apparent however that the embodiments may be carried out without those specifically detailed particulars. Also, well-known functions or constructions will not be described in detail so as to avoid obscuring the description with unnecessary detail. It should be also noted that in the drawings, the dimensions of the features are not intended to be to true scale and may be exaggerated for the sake of allowing greater understanding.

Figure 6:
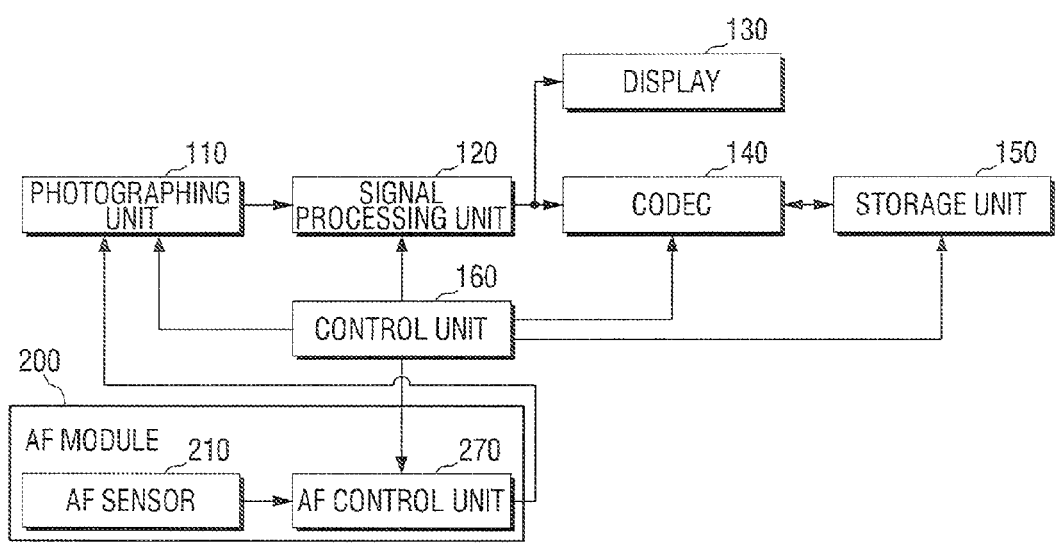
FIG. 6 is a block diagram of a digital single lens reflex (DSLR) camera according to an embodiment of the present disclosure.

FIG. 6 is a block diagram of a digital single lens reflex (DSLR) camera according to an embodiment of the present disclosure. The DSLR camera according to an embodiment may comprise a photographing unit 110, a signal processing unit 120, a display 130, a codec 140, a storage unit 150, a control unit 160 and an AF module 200 as illustrated in FIG. 6.

The photographing unit 110 may convert the image of a subject received through the lens onto the optical surface of an image pick-up element of the camera into an image signal.

The signal processing unit 120 may perform an image signal processing on the image signal output by the photographing unit 110. An example of image signal processing performed by the signal processing unit 120 may include digital zooming.

The codec 140 may compress the image signal which has been signal-processed by the signal processing unit 120 to produce an image file. The storage unit 150 may be configured to store therein the image file produced by the codec 140, and to that end may include a storage medium, such as, for example, a memory, a Flash memory, a Secure Digital (SD) memory, or the like.

The storage unit 150 may additionally read an image file recorded in the storage medium, and may transmits the read image file to the codec 140. The codec 140 may decompress the received image file to generate an image signal.

The display 130 may display the image signal that has been generated by the photographing unit 110 and signal-processed by the signal processing unit 120. In addition, the display 130 may also display the image file that has been read by the storage unit 150 and decompress by the codec 140.

The control unit 160 may be configured to control the operations of the photographing unit 110, the signal processing unit 120, the codec 140 and/or the storage unit 150 according to user commands. In addition, the control unit 160 may control the operation, of the AF module 200 so that the automatic focusing operations are performed according to an AF mode set by a user or according a default AF mode set automatically.

The AF module 200 may perform the auto focusing using, for example, a phase difference detection method that is well known to those skilled in the art, according to a specific AF mode as determined by the control unit 160. The AF module 200 according to an embodiment may include an AF sensor 210 and an AF control unit 270.

The AF sensor 210 may generate the AF data used for controlling the auto focusing. For example, the AF control unit 270 controls the auto focusing of the photographing unit 110 by controlling the location and/or direction of the lenses in the photographing unit 110 based on the AF data generated by the AF sensor 210.

Figure 7:
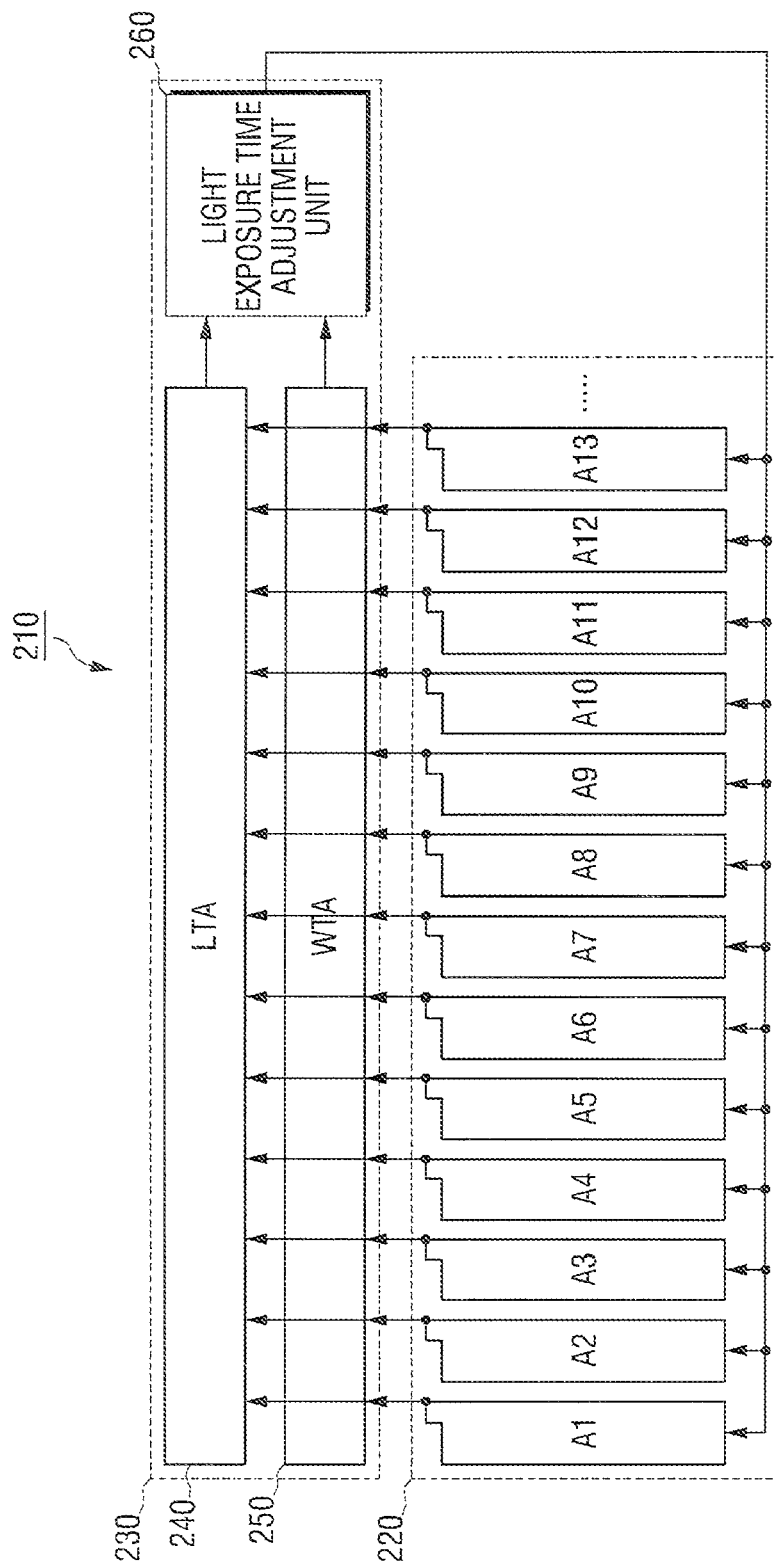
FIG. 7 is a schematic illustration of the AF sensor of FIG. 6.

FIG. 7 is a schematic illustration of the AF sensor 210 of FIG. 6. As illustrated in FIG. 7, the AF sensor 210 may comprise AF pixels 220 (A1, A2, A3, . . . ) and a light exposure control unit 230.

The AF pixels (A1, A2, A3, . . . ) may generate the AF data, and may transmits the same to the AF control unit 270. The configuration of each of the AF pixels (A1, A2, A3, . . . ) may be substantially the same.

Figure 8:
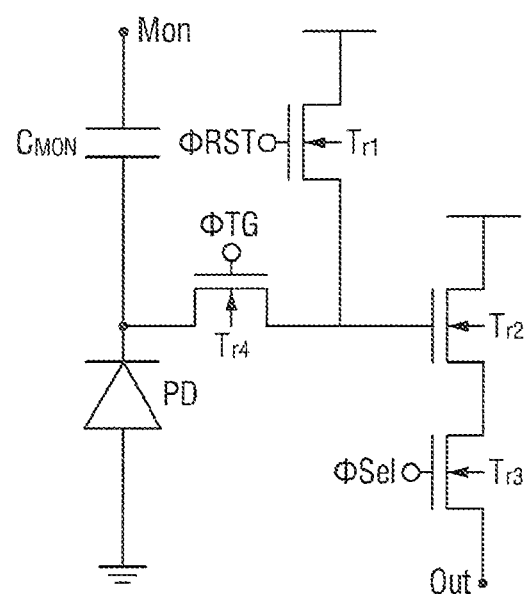
FIG. 8 is a circuit diagram of an AF pixel of FIG. 7.

FIG. 8 is a circuit diagram of a single AF pixel according to an embodiment of the present disclosure. As illustrated in FIG. 8, the AF pixel may comprise a photodiode PD, transistors (Tr1, Tr2, Tr3, and Tr4) and a monitoring capacitor ($C_{MON}$).

The photodiode PD is a light-receiving element that receives a portion of the light received through the lenses in the photographing unit 110.

The transistors (Tr1, Tr2, Tr3, and Tr4) are circuit elements arranged to generate the AF data using the output of the photodiode PD. Since it includes four transistors, the AF pixel according to an embodiment shown in FIG. 8 may be referred to as having a 4-Tr structure.

The transistor Tr1 is configured to discharge the electrical charge accumulated in the photodiode PD, and may thus be the reset transistor for resetting the photodiode PD. The transistors Tr2 and Tr3 form a source follower, which transmit to the output terminal an amplified output of the PD received through the transistor Tr4.

AF data may be the output of the PD processed by the transistors (Tr1, Tr2, Tr3, and Tr4), that is, the output at the output terminal may be the AF data. The AF data may be transmitted to the AF control unit 270 via the output terminal.

One end of the monitoring capacitor ($C_{MON}$) may be connected to the cathode (i.e., the N-pole or the N-doped side of a PN junction diode) of the PD. Therefore, the electrical charge accumulated in the monitoring capacitor ($C_{MON}$) may be proportional to the amount of the electrical charge in the PD.

The other end of the monitoring capacitor ($C_{MON}$) is connected to a monitoring terminal (Mon), which terminal may be connected to the light exposure control unit 230.

The light exposure control unit 230 may monitor the amount of electrical charge in the monitoring capacitor ($C_{MON}$) in real time via the monitoring terminal (Mon). As previously discussed above, the electrical charge in the monitoring capacitor ($C_{MON}$) may be proportional to the electrical charge in the PD. The electrical charge in the PD may in turn be proportional to the amount of light received by the PD.

Accordingly, the light exposure control unit 230 may be capable of monitoring information regarding the amount of light received by the PD in real time via the monitoring terminal (Mon). In other words, the monitoring capacitor ($C_{MON}$) provides an information regarding the amount of light received by the associated PD to the light exposure control unit 230 in real time.

Figure 9:
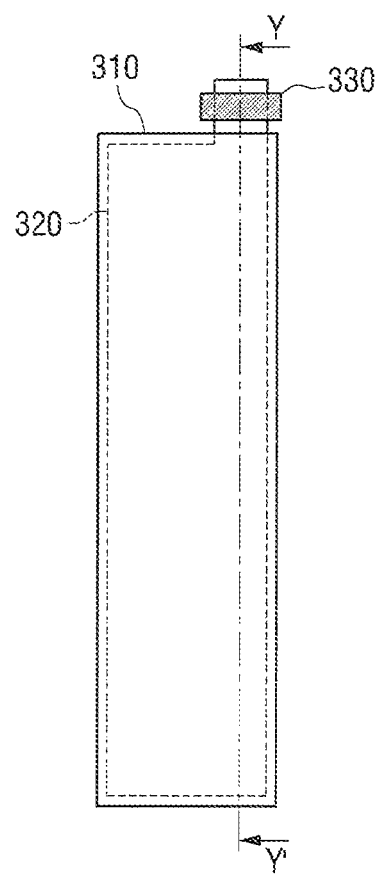
FIG. 9 is a schematic top view of a PD and a monitoring capacitor according to an embodiment of the present disclosure.
Figure 10:
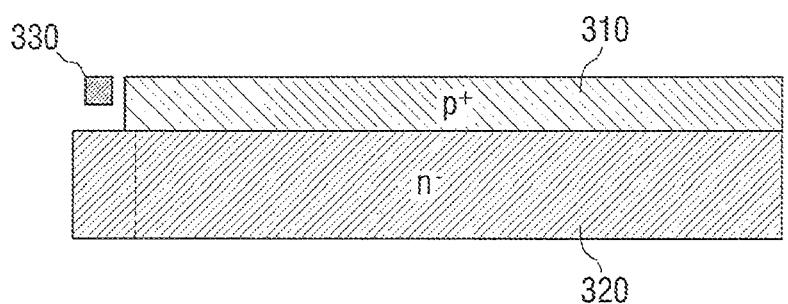
FIG. 10 is a sectional view of the PD and the monitoring capacitor illustrated in FIG. 9 cut along the dashed dotted line y-y'.

FIG. 9 is a schematic illustration of a photodiode PD and a monitoring capacitor ($C_{MON}$) viewed from the top. FIG. 10 shows a cross-sectional view of the PD and the monitoring capacitor ($C_{MON}$) of FIG. 9 cut along with a dashed dotted line y-y'.

Referring to the FIGS. 9 and 10, the PD may be formed as an n-layer 320 and a p+ layer 310 in contact with each other. A poly electrode 330 may be arranged to be spaced apart from the n-layer 320 in such a manner the n-layer 320 and the poly electrode together form the monitoring capacitor ($C_{MON}$). For example, as shown in FIGS. 9 and 10, one end of the n-layer 320 may be arranged to extend past the P+ layer 310 so as to form a protrusion portion that is not in contact with the p+ layer 310. Such protruding portion of the n-layer 320 may form the monitoring capacitor ($C_{MON}$) together with the poly electrode 330.

Although this is not illustrated in the FIGS. 9 and 10, it should be understood that it is possible to adjust the capacitance of the monitoring capacitor ($C_{MON}$) by including material of various dielectric constants between the n-layer 320 and the poly electrode or by adjusting the dimensions of the protruding portion of the n-layer 320 and/or the poly electrode.

Hereinafter, the light exposure control unit 230 of the AF sensor 210 will be described in greater detail with reference to FIG. 7. As, illustrated in FIG. 7, the light exposure control unit 230 may comprise a WTA 240, a LTA 250 and a light exposure time adjustment unit 260.

The WTA 240 may be configured to determine the maximum value from among the amounts of received light of the AF pixels 220, and to output the determined maximum value to the light exposure time adjustment unit 260. The amounts of received light of each of the AF pixels 220 can be obtained from the electrical charge accumulated in the corresponding associated monitoring capacitor ($C_{MON}$) as described previously.

The LTA 250 may be configured to determine the minimum value from among the amounts of received light of the AF pixels 220, and to output the determined minimum value to the light exposure time adjustment unit 260.

The light exposure time adjustment unit 260 may be configured to determine, the state of received light of the AF pixels 220 using the maximum value and the minimum value output from the WTA 240 and the LTA 250, respectively. The light exposure time adjustment unit 260 may further be configured to control the light exposures of the AF pixels 220 based on the determined state of received light.

For example, if it is determined that the amount of received light in the AF pixels 220 reaches a reference amount, the light exposure time adjustment unit 260 may output a light exposure termination signal as a light exposure control signal to the AF pixels 220.

Figure 11:
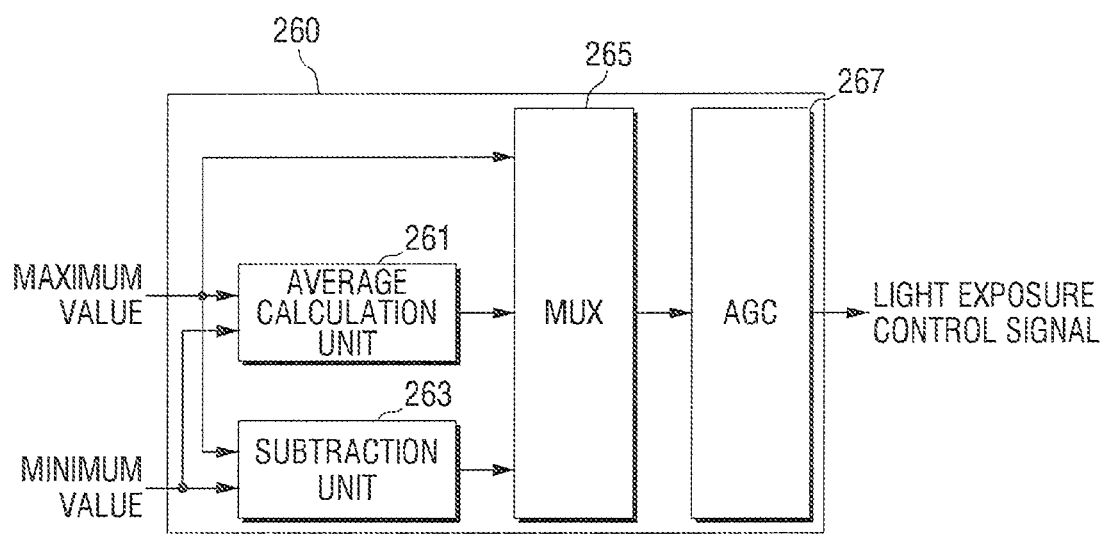
FIG. 11 is a block diagram of the light exposure time adjustment unit of FIG. 7.

FIG. 11 is a block diagram of the light exposure time adjustment unit 260 according to an embodiment of the present disclosure. As illustrated in FIG. 11, the light exposure time control unit 260 may comprise an average calculation unit 261, a subtraction unit 263, a multiplexer (MUX) 265 and an AGC 267.

The average calculation unit 261 may be configured to calculate the average of the maximum value and the minimum value output from the WTA 240 and the LTA 250, respectively.

The subtraction unit 263 may be configured to calculate the difference between the maximum value and the minimum value output from the WTA 240 and the LTA 250, respectively.

The MUX 265 may be configured to selectively output one of 1) the maximum value output from the WTA 240; 2) the average value calculated by the average calculation unit, 261; and 3) the difference calculated by the subtraction unit 263.

Which value will be output from the MUX 265 may be determined by the control unit 160. That is, the control unit 160 may control the MUX 265 to output a select value according to the AF mode set by a user or according to a default AF mode set automatically by the camera.

Specifically, the control unit 160 may control the MUX 265 so that 1) the maximum value is output from the MUX 265 in AF mode #1; 2) the average value is output from the MUX 265 in AF mode #2; and 3) the difference is output from the MUX 265 in AF mode #3.

If the output of the MUX 265 reaches a reference value, the AGC 267 may output a light exposure termination signal as a light exposure control signal. The light exposure control signal output from the AGC 267 may be provided to each of the AF pixels 220.

That the output of the MUX 265 reaches a reference value means the amount of received light in the AF pixels 220 reaches a reference amount. Therefore, the AGC 267 controls the AF pixels 220 so that the AF pixels 220 maintains the light exposure until the amount of received light reaches the reference amount.

In the embodiments of the present disclosure described above, it has been described that the light exposure time of the PD may be controlled based on the amount of received, light of the PD. However, controlling of the light exposure time is described only as an illustrative example. That is, one or more aspects of the present disclosure can be applied to the case in which other aspects of the operation of the PD is controlled based on the amount of received light of the PD.

According to an alternative embodiment of the present disclosure, the light exposure control unit 230 may be configured to control the light exposure time of the AF pixels 220 by monitoring the amount of received lights only a subset of AF pixels 220, i.e., monitoring of every AF pixels 220 may not be necessary. To that end, according to an embodiment, one or more switching elements may be placed between the light exposure control unit 230 and the AF pixels 220. The switching element may be operated so that the light exposure control unit 230 receives the amounts of received light of select ones of the AF pixels 220. According to an alternative embodiment, the subset of the AF pixels 220 to be monitored may be determined in advance, in which case no switching elements may be necessary.

For the purposes of illustration, in the descriptions above, a DSLR camera is described as an example of a photographic device. However, one or more aspects of the present disclosure may be applied to other photographing apparatuses other than a DSLR camera, for example, a film camera.

One or more the technical features of the present disclosure may also be applied to an AF module 200 or an AF sensor 210 implemented as a separate standalone device.

While the disclosure has been particularly shown and described with reference to several embodiments thereof with particular details, it will be apparent to one of ordinary skill in the art that various changes may be made to these embodiments without departing from the principles and spirit of the invention, the scope of which is defined in the following claims and their equivalents.

What is claimed is:

1. A photographing apparatus, comprising:
   one or more lenses through which light is received into the photographing apparatus;
   an auto focus (AF) sensor configured to generate AF data; and
   an AF control unit configured to receive the AF data from the AF sensor and to control focusing of the one or more lenses using the received AF data,
   wherein the AF sensor includes a plurality of AF pixels and a control element, each of the plurality of AF pixels comprising:
      a light-receiving element configured to receive a portion of the light received into the photographing apparatus and to produce an output in response to the received portion of the light; and
      a circuit element configured to generate the AF data using the output of the light-receiving element, and
   wherein the control element of the AF sensor is configured to receive, from each of a first set AF pixels among the plurality of AF pixels, an information about an amount of light received by the light-receiving element of the respective one of the first set AF pixels, the control element of the AF sensor being configured to control an operation of the plurality of AF pixels based on the information about the amount of received light received from the first set AF pixels.

2. The photographing apparatus of claim 1, wherein the first set AF pixels includes each and every one of the plurality of AF pixels.

3. The photographing apparatus of claim 1, further comprising:
   a photographing unit configured to output an image signal in response to the light received into the photographing apparatus through the one or more lenses;
   a signal processing unit configured to receive the image signal from the photographing unit and to perform a signal processing on the received image signal to produce image data;
   a codec configured to receive the image data from the signal processing unit and to compress the received image data to produce a compressed image data; and
   a storage unit configured to store therein the compressed image data.

4. The photographing apparatus of claim 1, wherein the control element receives the information about the amount of received light of the light-receiving element in real time.

5. The photographing apparatus as claimed in claim 1, wherein each of the plurality of AF pixels includes four transistors.

6. The photographing apparatus of claim 1, wherein the control element is configured to control a light exposure time of the light-receiving element of each of the plurality of AF pixels using the received information about the amount of received light.

7. The photographing apparatus of claim 1, wherein each of the plurality of AF pixels further comprises a capacitor connected to the light-receiving element, and
wherein the information about the amount of received light of the light-receiving element comprises a level electrical charge present in the capacitor.

8. The photographing apparatus of claim 7, wherein the capacitor is connected to an N-pole of the light-receiving element.

9. The photographing apparatus of claim 7, wherein the light-receiving element comprises a photodiode, and
wherein the capacitor comprises an electrode and an area of an n-layer of the photodiode arranged to extend parallel to, and spaced apart form, each other.

10. The photographing apparatus of claim 9, wherein the electrode comprises a poly electrode.

11. The photographing apparatus of claim 9, wherein the area of the n-layer of the photodiode that forms the capacitor together with the electrode is not in contact with a p+ layer of the photodiode.

12. The photographing apparatus of claim 11, wherein the area of the n-layer of the photodiode that forms the capacitor together with the electrode extends to protrude beyond the p+ layer of the photodiode.

13. The photographing apparatus of claim 1, further comprising:
a switching unit arranged between the plurality of AF pixels and the control element,
wherein the switching unit is configured to selectively establish communicative connections between select ones of the plurality of AF pixels and the pixel control unit.

14. The photographing apparatus as claimed in claim 1, wherein the control unit is configured to control the operation of the light-receiving element based on one of: 1) a maximum value from among the amounts of light received by the light-receiving elements of the plurality of AF pixels; 2) an average value of the maximum value and a minimum value from among the amounts of light received by the light-receiving elements of the plurality of AF pixels; and 3) a difference between the maximum value and the minimum value.

15. The photographing apparatus as claimed in claim 14, wherein the control element is configured to terminate light exposure of the light-receiving elements of the plurality of AF pixels when one of maximum value, the minimum value and the difference reaches a reference value.

16. An auto focus (AF) module for controlling focusing of a photographing unit of a photographing apparatus, comprising:
an AF sensor configured to generate AF data; and
a control unit configured to control the focusing of the photographing unit using the AF data generated by the AF sensor,
wherein the AF sensor includes a plurality of AF pixels and a control element, each of the plurality of AF pixels comprising:
a light-receiving element configured to receive a portion of light incident upon the photographing unit and to produce an output in response to the received portion light; and
a circuit element configured to generate the AF data using the output of the light-receiving element, and
wherein the control element is configured to receive, from each of a first set of AF pixels among the plurality of AF pixels, an information about an amount of light received by the light-receiving element of the respective one of the first set of AF pixels, and to control operations of the plurality of AF pixels based on the received information about the amount of received light.

17. The AF module of claim 16, wherein the each of the plurality of the plurality of AF pixels further comprises a capacitor connected to the light-receiving element, and wherein the information about the amount of received light of the light-receiving element comprises a level electrical charge present in the capacitor.

18. The AF module of claim 17, wherein the light-receiving element comprises a photodiode, and
wherein the capacitor comprises an electrode and an area of an n-layer of the photodiode arranged to extend parallel to, and spaced apart form, each other.

19. The AF module of claim 16, wherein the control element receives the information about the amount of received light by the light-receiving from each and every one of the plurality of AF pixels.

20. The AF module as claimed in claim 16, wherein the control unit is configured to control the operation of the light-receiving element based on one of: 1) a maximum value from among the amounts of light received by the light-receiving elements of the plurality of AF pixels; 2) an average value of the maximum value and a minimum, value from among the amounts of light received by the light-receiving elements of the plurality of AF pixels; and 3) a difference between the maximum value and the minimum value.

* * * * *